April 26, 1960 D. D. HOLMES 2,934,599

MILLER EFFECT CONTROL OF BANDPASS IN VICINITY OF SUBCARRIER FREQUENCY

Filed March 31, 1955 2 Sheets-Sheet 1

INVENTOR.
DAVID D. HOLMES
BY [signature]
ATTORNEY

INVENTOR.
DAVID D. HOLMES
BY [signature]
ATTORNEY

United States Patent Office
2,934,599
Patented Apr. 26, 1960

2,934,599

MILLER EFFECT CONTROL OF BANDPASS IN VICINITY OF SUBCARRIER FREQUENCY

David D. Holmes, Princeton, N.J., assignor to Radio Corporation of America, a corporation of Delaware Application March 31, 1955, Serial No. 498,133
4 Claims. (Cl. 178—5.4)

The present invention relates to new and improved apparatus for controlling the response of wide band amplifiers and, more particularly, to chroma control apparatus for use in conjunction with color television receivers.

In accordance with the color television standards promulgated by the Federal Communications Commission on December 17, 1953, the transmitted composite color television signal includes, in addition to scanning synchronizing information in the form of pulses, a luminance signal which is indicative of the brightness of elemental areas of the image being televised and a chrominance signal in the form of a phase- and amplitude-modulated subcarrier wave which is representative of the hue and saturation of the image. The subcarrier wave has a nominal or mean frequency of approximately 3.58 megacycles per second, which frequency is in the high frequency region of the video signal spectrum. Since, in the reconstruction of the television image at the receiver, the saturation of the image is dependent upon the amplitude of the chrominance signal or subcarrier information, it is important that the gain of the receiver be controlled in such manner as to insure proper amplitude of the chrominance signal with respect to the luminance signal. Such control has been termed and will be referred to herein as "chroma control."

It is an object of the present invention to provide novel means for controlling the frequency response of a wide band amplifier in such manner as to control the response of the amplifier to afford differential amplification of different frequencies within a band of signal frequencies being amplified thereby.

Another and more specific object of the invention is to provide new and improved chroma control apparatus for maintaining the response of a color television receiver adjusted to provide a predetermined ratio of the amplitude of a chrominance signal with respect to the amplitude of the lower frequency luminance signal.

In general, the present invention exploits the well-known Miller effect of an amplifier tube whereby the input capacity of the tube varies generally in proportion to the gain of the tube. Specifically, when employed in conjunction with a signal amplifying channel, the present invention couples such a tube in circuit with the channel in such manner that its input capacity is so located electrically as to be effective in controlling the frequency response of a channel. Means are additionally provided for varying the gain of the tube, whereby to vary its input capacity in order to vary the frequency response of the channel.

Additional objects and advantages of the present invention will become apparent to those skilled in the art from a study of the following detailed description of the accompanying drawing, in which.

Figures 1, 2, 3, 4A:
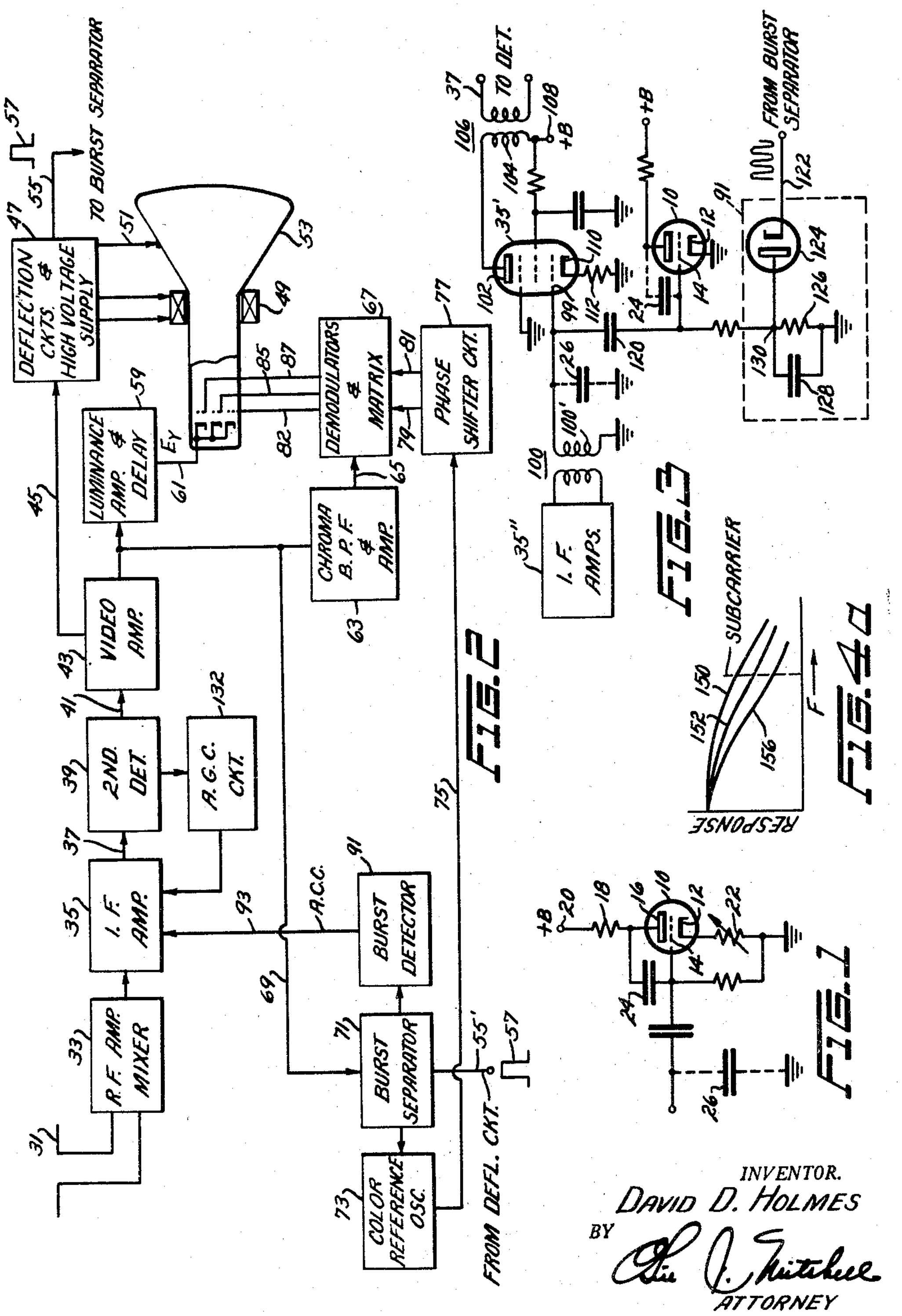
Figure 1 is a schematic diagram of an electron discharge tube circuit useful in describing the Miller effect.
Figure 2 illustrates, by way of a block diagram, a typical color television receiver with which the present invention may be advantageously employed as a chroma control arrangement.
Figure 3 is a block and schematic diagram of an arrangement in accordance with one form of the invention.
Figure 3A:
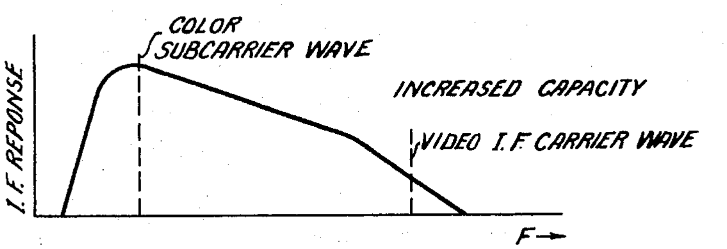
Figure 3B:
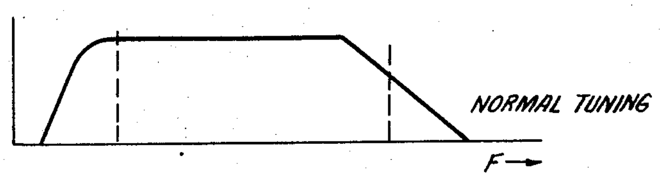
Figure 3C:
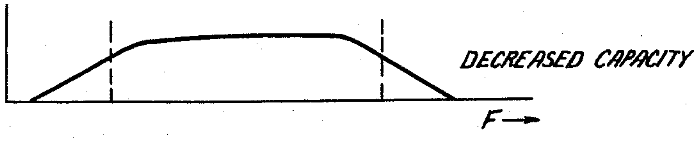
Figures 4, 5, 6:
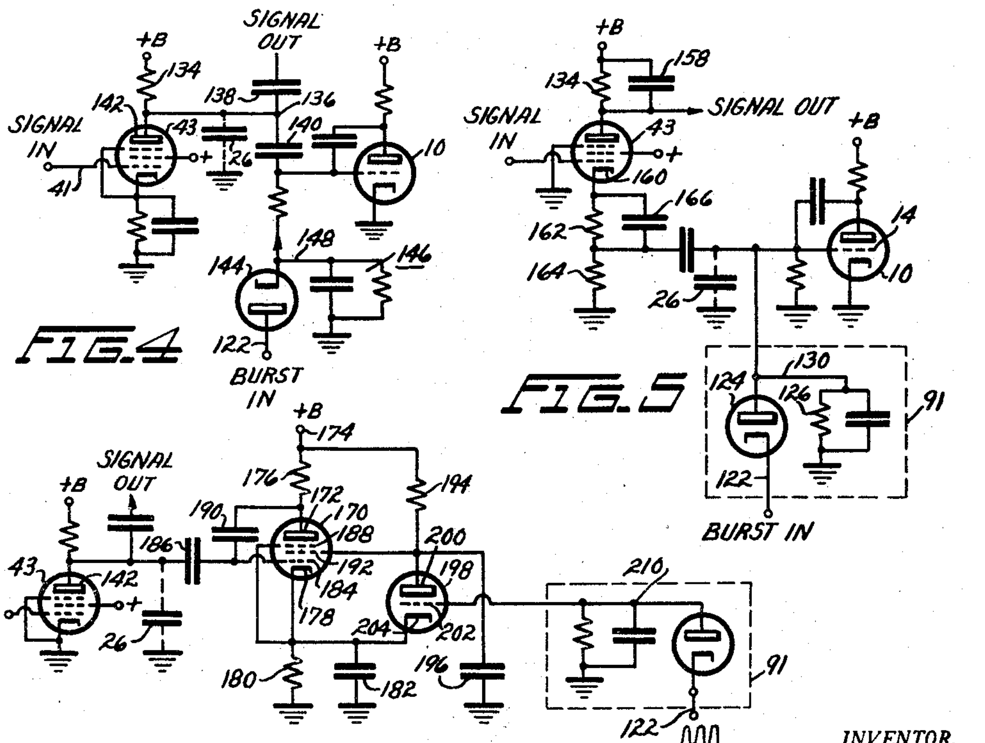

Figures 3*a*, 3*b* and 3*c* are response curves to be described in connection with the apparatus of Figure 3;

Figure 4 illustrates another form of the invention;

Figure 4*a* represents certain video amplifier response curves depicting the action of the circuit of Figure 4; and Figures 5 and 6 are schematic diagrams illustrative of additional forms of the invention.

In Figure 1, there is shown an electron discharge tube amplifier 10 having a cathode 12, control electrode 14 and anode 16. The anode of the tube is connected through a load resistance 18 to a source of positive operating potential at the terminal 20, while the cathode 12 is connected to a point of fixed reference potential (viz. ground) through a variable, unbypassed resistor 22. The plate or anode to grid capacitance of the tube 10 is illustrated by the capacitor 24. The apparent input capacitance of the amplifier tube 10 may be expressed as follows:

$$C_{\text{input}}=C_{GK}+(1+A)C_{GP}$$

where $C_{GK}$ is the control electrode-to-cathode capacitance, $C_{GP}$ is the control electrode-to-anode capacitance and A is the gain of the stage.

As explained in detail, for example, in chapter 7 of the "Radiotron Designers Handbook," third edition, as published for the Wireless Press, the grid input impedance of a triode type of electron discharge tube with a load in its plate circuit is a function of the impedance of the plate load and of the operating characteristics of the tube, which effect is known as the Miller effect. According to the Miller effect, if the plate load of such an electron discharge tube is a resistance, the input impedance of the tube is capacitive, which capacitive impedance may be varied by changing the bias on the control electrode of the tube. It will be understood, therefore, that the input capacity 26 shown in dotted lines in Figure 1 may be varied by varying the parameter A in the above equation. The gain of the electron tube amplifier 10 in Figure 1 may be varied, for example, through the agency of the variable cathode resistor 22 which, by virtue of the fact that it is not by-passed for alternating current, introduces a variable amount of cathode degeneration. In accordance with the present invention, the Miller effect as explained in accordance with the illustrative showing of Figure 1, is exploited in controlling the amplitude-versus-frequency response of a wide band amplifier channel, as will be explained more fully hereinafter.

In order to illustrate the applicability of the present invention in its various forms to a color television receiver and, particularly, as in a chroma controlling arrangement therefor, there is shown in Figure 2 a block diagram of such a receiver. An incoming carrier wave, amplitude-modulated by the composite color television signal, is intercepted by an antenna 31 and is applied to a tuner section 33 which includes radio frequency amplification stages and a mixer or first detector wherein the modulated carrier wave is translated in frequency to an intermediate frequency range. The intermediate frequency (IF) signals are, in turn, applied to an IF amplifier 35 which may, for example, comprise a plurality of stagger-tuned stages. The amplified IF signals are applied via a lead 37 to a second or video detector 39 which provides at its output terminal 41 the detected composite color television signal including scanning synchronizing pulses, bursts of subcarrier energy (i.e. color synchronizing bursts) on the "back porch" of the horizontal blanking pedestals and the broad band (e.g. 4.2 mcs.) of video signals including luminance and chrominance components. The composite signal thus recovered from the video detector 39 is amplified in a broad band video amplifier stage 43 and is applied simultaneously to several channels of the receiver, as follows: the signal is applied via a lead 45 to the deflection and high voltage circuits 47 comprising suitable means for generating scanning sawtooth current waves of television line and field frequencies for application to the electromagnetic deflection yoke 49. In a well known manner, the flyback voltage pulses produced in the horizontal deflection circuit are rectified to produce a high, unidirectional positive potential for application via lead 51 to the final anode of the tri-color kinescope 53. Also produced by the deflection circuits 47 and provided at the terminal 55 are burst gating pulses 57 corresponding to the horizontal flyback pulses and having a duration corresponding substantially to that of the color synchronizing burst referred to above. The gating pulses 57 may be produced, for example, through the agency of a flyback winding on the horizontal deflection output and high voltage transformer which forms a part of the horizontal deflection circuit.

The luminance signal component of the composite received television signal is applied from the video amplifier 43 to a luminance amplifier and delay circuit represented by the block 59 which provides at its output terminal 61 the luminance signal $E_y$ for application to the cathodes of the color image reproducing kinescope 53.

The composite color television signal is also applied to the band pass filter and amplifier stage 63 which serves to separate the subcarrier wave or chrominance signal information from the composite signal and to amplify the same. The amplified chrominance signal is, in turn, applied via a lead 65 to the demodulator and matrix circuit 67. The demodulators and matrix 67 may be understood as performing a process of synchronous demodulation upon the chrominance signal to derive therefrom the "color-difference" signals employed in modulating the phase and amplitude of the subcarrier wave at the transmitter. A detailed discussion of the operation of such circuitry may be found in an article entitled "Color Television Signal Receiver Demodulators" by D. H. Pritchard and R. N. Rhodes, June 1953 issue of the RCA Review. The demodulating action requires the provision of subcarrier frequency waves of fixed phase with respect to a reference, which waves may be derived from a color reference oscillator 73 producing a continuous 3.58 mcs. wave and synchronized as to phase and frequency by the color synchronizing bursts accompanying the composite signal. Specifically, the composite signal is applied from the output of the video amplifier 43 via a lead 69 to a burst separator circuit 71 which receives from the terminal 55 of the deflection circuits the burst gating pulses 57 which are applied to the burst separator circuit via the terminal 55'. The separated color synchronizing bursts are employed in synchronizing the operation of the color reference oscillator 73 as through the use of a frequency controlling circuit or AFC arrangement. Thus, the output wave from the oscillator 73 may be applied via a lead 75 to a phase shifting circuit 77 which provides, at its output leads 79 and 81, subcarrier waves of fixed phase with respect to the phase of the reference burst for application to the demodulators and matrix contained within the block 67. Through the process of synchronous demodulation, the circuit 67 produces the color-difference signals *R—Y*, *G—Y* and *B—Y*, where "R," "G" and "B" represent the component color signals and Y represents the luminance signal. The color difference signals from the demodulators in the circuit 67 are applied to the beam intensity controlling electrodes of the color kinescope 53 via the leads 82, 85 and 87, respectively, so that the kinescope serves to combine the color-difference signals with the luminance signal in such manner that the intensities of the respective beams of the kinescope are controlled in accordance with the component colors of the image being reproduced.

As thus far described, the apparatus illustrated in Figure 2 is of generally conventional form and need not be described further. As has been pointed out supra, control of the relative amplitudes of the chrominance and luminance components of the composite color television signal is required for the proper reproduction of the color television image. If, for example, there should occur a change in the relative levels of the color subcarrier wave and the main picture carrier wave at any point in the transmission link between the television transmitter and the receiver, as by reason of radio frequency transmitter response, propagation effects, receiving antenna response, RF tuning and the like, the degree of image saturation will be faulty unless corrected. Such correction may be accomplished, in accordance with the present invention, by varying the frequency response of the receiver at some point therein preceding the separation of the chrominance and luminance components of the composite signal. This function is represented diagrammatically in Fig. 2 by the burst amplitude detector block 91 which provides at its output lead 93 an automatic chroma control (A.C.C.) voltage or signal for application to the intermediate frequency amplifier 35. That is to say, the color synchronizing bursts inserted in the composite signal at the transmitter are of fixed amplitude relative to the main carrier wave, so that the amplitude of the bursts at the receiver will be understood as providing an indication of the response of the overall transmission link to the subcarrier frequency. Detection of the amplitude of the color synchronizing bursts as by rectification in the circuit 91 provides a direct current voltage varying in accordance with the amplitude of the 3.58 mc. per second color burst signal. According to the form of the invention indicated generally by Figure 2, the chroma control is effected in the IF amplifier 35. A specific arrangement suitable for performing the function indicated in Figure 2 is shown schematically in Figure 3 wherein the electron tube 35' may be considered as constituting one of several stagger-tuned amplifier stages of the IF amplifier portion of the receiver. The tube 35', illustrated as a pentode, forms a part of a conventional IF amplifier circuit.

The control electrode 99 of the tube 35' receives IF signals via the transformer 100 from the preceding amplifier stage 35''. The anode 102 of the amplifier 35' is connected through the primary winding 104 of a coupling transformer 106 to a positive operating potential (+B) at the terminal 108. The cathode 110 of the IF amplifier 35' is connected to a point of fixed reference potential (viz. ground) through a small biasing resistor 112.

Normally, the IF amplifier stages of a color television receiver of the type in question are tuned to have an overall response such as that shown by Figure 3*b*. Assuming, however, that the response of the transmission link falls in the region of the subcarrier wave frequency such that the amplitude of the chrominance signal decreases with respect to that of the luminance component, retuning of the intermediate frequency amplifier is accomplished by means of the additional circuitry of Figure 3.

A triode 10 corresponding to the tube bearing the same reference numeral in Figure 1 is arranged so that it is subject to the Miller effect as explained in connection with Figure 1. The control electrode 14 of the triode is coupled via a capacitor 120 to the control electrode 99 of the IF amplifier tube 35', so that the input capacity of the tube 10 is effectively across the secondary winding 100' of the coupling transformer 100, as shown at 26. Since, in the showing of Figure 3, the action of the chroma control tube 10 is automatic, rather than manual, it will be noted that the cathode 12 of the triode is connected directly to ground, rather than through an adjustable resistor, as in the case of Figure 1. Also, by reason of the fact that the circuit is operating upon the television intermediate frequencies, the inherent grid-to-plate capacity 24 of the triode is sufficient without the use of an additional physical capacitor such as is shown in Figure 1.

The color synchronizing bursts as separated by the circuit 71 are applied via a lead 122 to the rectifier or burst detector circuit 91 shown within the dotted line rectangle. The burst amplitude detector 91 comprises a conventional amplitude detector diode 124 having a load circuit comprising the parallel combination of a resistor 126 and filter capacitor 128.

In the operation of the apparatus of Figure 3, assuming that the IF amplifier stages are tuned so that their response is as shown by Figure 3*b*, automatic chroma control will be effected in the following manner: should the response of the transmission link fall undesirably in the region of the subcarrier frequency, the amplitude of the bursts as applied by the burst separator to the peak detector 91 will also decrease, so that the rectification of the bursts by the diode 124 will produce a less negative (i.e. more positive) potential at the terminal 130, thereby increasing the positive potential applied to the control electrode 14 of the Miller effect triode 10, whereby to increase the gain of the tube 10. As pointed out in connection with the showing of Figure 1, an increased gain of the tube subject to the Miller effect results in an increased capacitive input impedance 26 of that tube. The increase in capacity 26 across the input winding 100' of the IF amplifier 35' will have the effect of retuning the winding in the direction of increasing the response of the stage at the color subcarrier frequency, as shown by Figure 3*a*. Stated otherwise, the increase in capacity 26 tunes the winding 100' to a lower frequency, so that the response of the circuit is greater at the color subcarrier wave frequency.

Conversely, if the response of the transmission link should increase undesirably at the color subcarrier frequency, with respect to the main or video carrier frequency, a less positive potential will be produced at the terminal 130 by reason of the rectification of a burst of greater amplitude, thereby increasing the negative bias on the tube 10 so that its input capacity 26 is decreased. Such decreased input capacity 26 has the effect of retuning the transformer winding 100' upwardly as shown in Figure 3*c*, and in such manner as to decrease the response of the stage at subcarrier frequency. As will be understood, the overall response of the IF amplifier stages is maintained substantially constant by the action of a conventional automatic gain control (A.G.C.) circuit indicated diagrammatically by the block 132 in Figure 1. Such A.G.C. circuits conventionally serve to control the gain of the IF amplifier stages in accordance with the detected amplitude of the deflection synchronizing or blanking signals of the composite signal in order to maintain the amplitude of such signals susbtantially constant at the output of the IF channel. That is, the deflection signal acts as a reference component insofar as the luminance signal is concerned. Thus, the effect of the automatic chroma control arrangement including the burst rectifying means and the Miller effect tube 10 is that of varying the frequency response of the receiver IF amplifier (in Figures 1 and 3) in order to maintain the proper relative amplitudes of subcarrier and luminance signals.

Figure 4 illustrates another form of the invention for providing automatic chroma control in a color television receiver of the type indicated in Figure 2. According to the arrangement of Figure 4, the automatic chroma control is applied to a video amplifier which serves to amplify the detected luminance and chrominance signals. Thus, for example, the amplifier 43 of Figure 4 may be the amplifier bearing the same reference numeral in Figure 2. The amplifier 43 is illustrated as a conventional pentode video frequency amplifier whose anode load circuit is represented by the load resistor 134. While the load impedance is thus simply represented, it will be understood that various peaking coils and the like may be included in a conventional manner. The video signals from the detector are applied to the control electrode of the amplifier 43 via the lead 41 and appear in amplified form at the output terminal 136 for application via a capacitor 138 to the several additional channels of the receiver shown in Figure 2. The Miller effect control tube 10 of the type described in connection with Figures 1 and 2 is coupled to the terminal 136 via the capacitor 140, so that the input capacity of the tube 10 is effectively connected between the anode 142 of the amplifier 43 and ground. It will be noted that the burst rectifier in Figure 4 is oppositely polarized from that shown in the arrangement of Figure 3. That is, the rectifier in Figure 4 comprises the diode 144 so connected with its load circuit 146 that increased conduction of the diode produces a more positive potential at its load terminal 148.

In the operation of the apparatus of Figure 4, the input capacity 26 of the Miller effect control tube 10 effectively "loads" the video amplifier 43 in such manner as to decrease its high frequency response in proportion to the amount of the capacity. Assuming that the relative amplitudes of the chrominance and luminance signal components should change in such direction that the chrominance signal amplitude decreases with respect to that of the other signal, the burst applied to the detector diode 144 via the lead 122 will also decrease in amplitude, thereby producing a less positive potential at the terminal 148 than is normally present. Such decreased positive potential at the terminal 148 decreases the gain of the tube 10, thereby decreasing its input capacity 26, as explained. The decreased capacity 26 results in a decreased high frequency loading of the amplifier 43, so that its response characteristic is as represented by the curve 150 in Figure 4*a*. Specifically, the frequency response of the amplifier 43 is increased at the frequency of the subcarrier wave. This curve 150 may be compared with the curve 152 which represents the normal frequency response of the amplifier 43 when the relative amplitudes of the chrominance and luminance signals are of the proper ratio.

Conversely, if the response of the transmission link at the subcarrier frequency should increase undesirably with respect to its response at the luminance carrier frequency, the amplitude of the bursts applied to the terminal 122 for rectification by the diode 144 will also be increased, thereby providing a more positive potential at the terminal 148 for application to the control electrode of the tube 10, thereby increasing the gain of that tube to produce a proportionate increase in its input capacity 26. Such increased capacity has the effect of decreasing the high frequency response of the amplifier 43, so that the response is as represented by the curve 156 in Figure 4*a*, decreased at the frequency of the subcarrier wave so that the ratio of the amplitudes return to its proper value.

Figure 5 illustrates schematically another embodiment of the invention as applied to a video amplifier such as the amplifier 43 of Figure 2, for example. As opposed to the arrangement of Figure 4, however, the apparatus of Figure 5 performs its automatic chroma control function by varying the value of the capacitance by-passing the cathode resistor of the amplifier or, in other words, the amount of cathode "peaking." The amplifier 43 of Figure 5 is substantially the same as that shown in Figure 4, with the following exceptions: the load resistor 134 of the amplifier is by-passed by a small capacitor 158 for purposes which will become more fully apparent hereinafter. Also, the cathode 160 of the amplifier tube is connected to ground through a pair of serially arranged resistors 162 and 164. The resistors 162 and 164 afford self-bias for the amplifier 43, the resistor 162 being by-passed by a capacitor 166 for the prevention of cathode degeneration as a result of the resistor 162. The resistor 164, however, is by-passed to ground only by the inherent input capacity 26 of a triode 10 which is subject to the Miller effect and which corresponds to the tube 10 in each of Figures 1, 3 and 4. The control electrode 14 of the triode 10 is biased by a direct current potential derived in the burst rectifier 91. Separated bursts are applied to the cathode of the diode 124 via the lead 122, as in the arrangement of Figure 3. Rectification of the bursts by the diode 124 produces a direct current potential at the terminal 130 across the load resistor 126. Thus, increased conduction of the diode renders the terminal 130 less positive, thereby decreasing the gain of the triode 10. Conversely, decreased conduction of the diode 124 (by reason of a decreased amplitude of burst) renders the terminal 130 more positive, whereby to increase the gain of the triode 10.

In the operation of the apparatus of Figure 5, an undesirable increase in the frequency response of the transmission link at the subcarrier frequency relative to the luminance carrier frequency will result in an increased burst amplitude so that the potential at the terminal 130 becomes less positive, thereby decreasing the gain of the triode 10 so that its input capacity 26 is correspondingly decreased. The result of such decreased capacity 26 across the resistance 164 is that of decreasing the amount of high frequency peaking or, in other words, increasing the degeneration of the amplifier for the subcarrier frequency range. On the other hand, should the response of the transmission link fall in the region of the subcarrier wave frequency, the decreased burst amplitude will result in a more positive potential at the terminal 130 so that the gain of the triode 10 is increased, thereby increasing the input capacity 26 which by-passes the resistor 164. In this manner, the high frequency response of the amplifier 43 is peaked so as to increase the frequency response of the amplifier for the subcarrier wave frequency. A capacitor 158, referred to supra, serves to cancel out any residual high frequency rise in the response characteristic of the amplifier resulting from minimum cathode by-passing (i.e. when the value of the input capacity 26 of a triode 10 is at its minimum value).

Figure 6 illustrates another form of the invention in accordance with which automatic chroma control is afforded through the agency of means for varying the frequency response of an amplifier such as the video amplifier 43 of Figure 2. As opposed to the arrangements of Figures 4 and 5, however, the apparatus of Figure 6 employs a multi-grid tube (e.g. a pentode) 170 as the Miller effect device. The anode 172 of the pentode is connected to a +B terminal 174 through a load resistance 176, while the cathode 178 of the pentode is connected to ground through a self-biasing arrangement comprising the parallel combination of a resistor 180 and by-pass capacitor 182. The control electrode 184 of the pentode is coupled by a D.-C. blocking capacitor 186 to the anode 142 of the video amplifier 43. The suppressor grid electrode 188 of the Miller effect tube is connected to the cathode of the tube, as shown, while the anode 172 is coupled to the control electrode 184 via a capacitor 190 for increasing the Miller effect within the tube 170. The screen grid electrode 192 of the pentode is connected to the +B terminal 174 through a voltage dropping resistor 194 and is by-passed to ground through a capacitor 196, as indicated.

In accordance with the arrangement of Figure 6, control of the gain of the Miller effect tube, and, therefore, its input capacity 26 is accomplished by varying the potential of the screen grid electrode 192 of the pentode in the following manner: a control tube 198 shown as a triode having an anode 200, control electrode 202 and cathode 204 is connected so that its cathode-anode discharge path is in series with the screen dropping resistor 194 of the pentode 170. That is to say, the resistance 194 comprises the anode load resistor of the triode 198. Thus, the greater the conduction of the triode 198, the lower will be the potential applied to the screen grid electrode 192 of the pentode.

Conduction of the triode 198 is controlled by a direct current voltage derived by rectification of the color synchronizing bursts, as described in connection with the preceding figures. Specifically, the separated bursts are applied to the input lead 122 of the rectifier 91 which provides at its output terminal connected to the control electrode 202 of the triode a potential which becomes more negative as the amplitude of burst increases and less negative as the burst amplitude decreases. Thus, assuming that the response of the link is such that the subcarrier frequency response is greater than it should be, the potential at the terminal 210 connected to the control electrode 202 of the triode will become more negative, decreasing conduction of the triode 198 with the result that its anode 200 and the screen grid electrode 192 of the pentode will become more positive. The gain of the pentode 170 will therefore increase so that its input capacity 26 which loads the anode 142 of the video amplifier will also increase, thereby decreasing the high frequency response of the amplifier 43 and returning the amplitude of the chrominance signal to its proper value relative to that of the luminance signal. The reverse action occurs when the response of the transmission link to subcarrier frequency decreases. That is, the decreased burst amplitude will result in a less negative potential at the terminal 210, thereby increasing conduction to the triode 198 so that its anode 200 and the screen grid electrode 192 of the pentode will decrease in potential to decrease the gain of the pentode and its input capacity 26 which loads the video amplifier.

While, in the description of the arrangements of Figures 4 and 6, the load impedance of the video amplifier being controlled in accordance with the invention has been illustrated and described as a simple load resistor, it should be borne in mind that, where such a load is complex and includes reactive components such as "series" and "shunt" peaking inductances, for example, use of the variable input capacity of the Miller effect tube may be employed to produce changes in frequency response of the amplifier other than or in addition to the simple variation in the high frequency response. For example, the Miller effect tube may be used to alter the pass band characteristic of the video amplifier with which it is associated to provide a more restricted (i.e. narrower) peak in its frequency response.

From the foregoing, those skilled in the art will recognize that the present invention provides in accordance with its various forms relatively simple means for controlling the frequency response of an amplifier and in such manner, as illustrated, as to provide automatic chroma control for a color television receiver.

Having thus described my invention, what I claim as new and desire to secure by Letters Patent is:

1. In a color television receiver, the combination of: a source of composite color television signals including a luminance component of a predetermined frequency band, a chrominance component in the form of a phase and amplitude modulated subcarrier wave having a frequency corresponding to a relatively high frequency within said predetermined frequency band, a luminance reference component comprising periodic deflection synchronizing pulses, and a chrominance reference component comprising periodic bursts of a predetermined number of unmodulated cycles of said subcarrier wave; signal processing apparatus coupled to receive said composite signals from said source, said apparatus including an intermediate frequency amplifier having at least one intermediate frequency amplifier stage and a video amplifier having at least one video frequency amplifier stage, and a signal detector coupled between said intermediate frequency amplifier and said video frequency amplifier to convert said intermediate frequency signal to a video frequency signal;

an electron discharge tube having an inherent input capacitance variable in direct proportion to its gain; means coupling said tube to the input of one of said amplifier stages such that said capacitance is so located electrically in said one of said amplifier stages to be effective to control substantially only the amplitude versus frequency response of said apparatus in the frequency region of said chrominance component; an automataic gain control circuit coupled to said detector for receiving said luminance reference component therefrom and to said intermediate frequency amplifier for so controlling its gain in response to said luminance reference component as to maintain the amplitude of said luminance signal component at the output of said signal processing apparatus substantially constant; means coupled to said signal processing apparatus to derive from said detected video frequency signal a control signal proportional to the intensity of said chrominance reference component; and means coupled to said control signal deriving means and to said electron discharge tube for varying its input capacitance, thereby to alter the amplitude versus frequency response of said signal processing apparatus to said chrominance component in accordance with said control signal.

2. In a color television receiver, the combination as defined in claim 1 wherein, said one of said amplifier stages is said video frequency stage which is provided with a load impedance device, and the input capacitance of said electron discharge tube is effectively connected in shunt with said load impedance device.

3. In a color television receiver, the combination as defined in claim 1 wherein, said one of said amplifier stages is said video frequency stage and comprises an electron amplifier tube having at least an anode and a load impedance device connected to said anode, and the input capacitance of said electron discharge tube is effectively in shunt with said load impedance device, such that an increase in said capacitance produces a decreased high frequency response in said video frequency stage.

4. In a color television receiver, the combination as defined in claim 1 wherein, said one of said amplifier stages is said video frequency stage and comprises an electron amplifier tube having at least a cathode and a degenerative impedance device connected to said cathode, and the input capacitance of said electron discharge tube is effectively in shunt with at least a portion of said degenerative impedance device, such that an increase in said capacitance produces an increased high frequency response in said video frequency stage.

References Cited in the file of this patent

UNITED STATES PATENTS

| | | |
|---|---|---|
| 2,120,998 | Barber | Jan. 21, 1938 |
| 2,579,345 | Sziklai | Dec. 18, 1951 |
| 2,798,900 | Bradley | July 9, 1957 |

FOREIGN PATENTS

| | | |
|---|---|---|
| 702,627 | Great Britain | Jan. 20, 1954 |